J. W. Emerson's Wagon Hub Reamer

74062

PATENTED FEB 4 1868

Witnesses:

Inventor:
J. W. Emerson

United States Patent Office.

J. W. EMERSON, OF ROCHESTER, MINNESOTA.

Letters Patent No. 74,062, dated February 4, 1868.

---

IMPROVEMENT IN MACHINES FOR BORING WAGON-HUBS.

---

*The Schedule referred to in these Letters Patent and making part of the same.*

---

TO ALL WHOM IT MAY CONCERN:

Be it known that I, J. W. EMERSON, of Rochester, in the county of Olmstead, and State of Minnesota, have invented a new and useful Improvement in Wagon-Hub Reamer; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
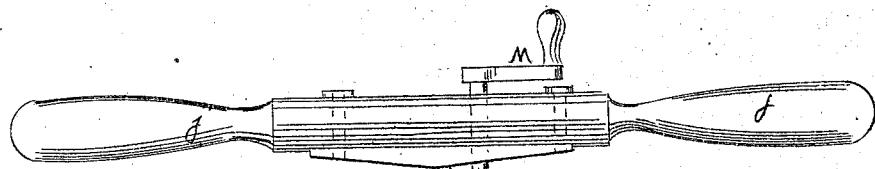
Figure 1 is a side view of my improved machine attached to a hub, part of the hub being broken away to show the construction of the cutter.
Figure 1:
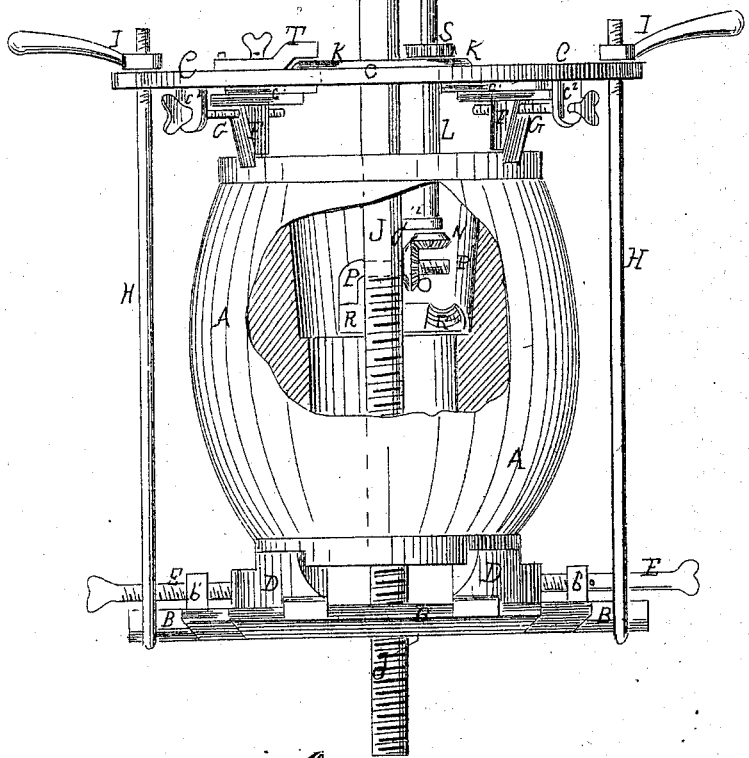
Figure 2:
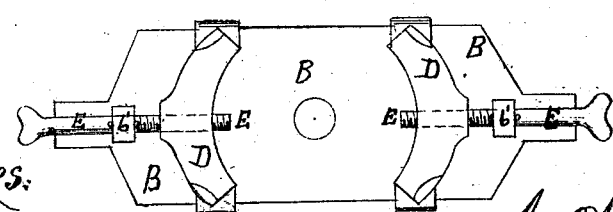
Figure 2 is a detail view of the forward plate.

My invention has for its object to furnish an improved machine by means of which wagon and other hubs may be reamed out quickly and accurately, so as to be ready to at once receive the cast-iron box; and it consists in the combination and arrangement of the various parts by which the cutter is adjusted to ream a hole of the desired size, and to give the required taper to the said hole; the whole being constructed and arranged as hereinafter more fully described.

A represents a wagon-hub, which is clamped between the plates B and C. D are sliding blocks, having shoulders formed upon their upper sides, and having a broad dove-tailed slot formed in their under sides to receive the said plate B, upon which they slide back and forth. E are thumb-screws, swivelled to supports $b'$ attached to the plate B, and screwing into the sliding blocks D, so that, by turning the said screws, the said blocks may be moved forward to clamp the end of the hub, or to adjust its position. $c^1$ are dove-tailed grooves, formed upon the under side of the plate C, in which the upper ends of the blocks or arms F slide back and forth as they are moved by the thumb-screws G, swivelled to the projections $c^2$ formed upon or attached to the under side of the plate C. The sliding blocks F, three at least of which should be used, have shoulders formed upon their lower ends to receive and hold the end of the hub A. The plates B and C are connected to each other by the rods H, which have loops or eyes formed upon their lower ends to receive the ends of the plate B, and have screw-threads cut upon their upper ends, upon which are screwed the thumb-nuts I, to clamp the hub A. This construction enables the hub to be so adjusted that the hole through it may be in the centre of the wheel, even if it should be at one side of the centre of the said hub. J is a shaft, having a handle, $j^1$, similar to an ordinary auger-handle, attached to its upper end, and having a screw-thread cut upon its lower part, which screws into a hole formed in the centre of the plate B. The shaft J passes through the centre of a small circular plate, K, which works in a hole formed in the centre of the plate C. L is a small shaft, which passes down at the side of the shaft J, through the handle $j^1$, through the small circular plate K, and through a support, $j^2$, attached to the middle part of the said shaft J, so as to be carried with the said shaft in its revolutions. The shaft L has a small crank, M, attached to its upper end, and a small bevel-gear wheel, N, attached to its lower end, the teeth of which mesh into the teeth of the bevel-gear wheel O, which works upon the screw-thread cut upon the end of the arm P, which passes through a slot formed in the shaft J, and its other end is attached to the shank of the cutter R, which also passes through the same slot in the said shaft J, so that, by turning the shaft L by means of the crank M, the cutter R may be moved out or in, according to the required size of the hole. S is a small gear-wheel, which rests upon the plate K, which allows the shaft L to slide freely through it, and which is made to revolve with the said shaft by having a feather formed in it, which enters a longitudinal slot or groove formed in the said shaft. T is a stop, removably attached to the upper side of the plate C by a set-screw and dowel-pin, and which serves a double purpose, first, that of a button to keep the small plate K securely in place, and, second, that of a finger to engage with the teeth of the sliding-gear wheel S, and partially rotate it, independently of the shaft J, at each revolution of the said shaft J, so as to draw the cutter R gradually and regularly inward, and give the desired taper to the hole in the hub.

I claim as new, and desire to secure by Letters Patent—

The small shaft L, in combination with the shaft J, handle $j$, gear-wheel S, circular plate K, stop T, gear-wheels N O, and cutter R, substantially as described for the purpose specified.

J. W. EMERSON.

Witnesses:
WALTER S. BOOTH.
J. A. LEONARD.